(12) United States Patent
Ko

(10) Patent No.: US 9,257,070 B2
(45) Date of Patent: Feb. 9, 2016

(54) IMAGE DISPLAY METHOD AND DISPLAY SYSTEM

(71) Applicant: Acer Incorporated, New Taipei (TW)

(72) Inventor: Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 47 days.

(21) Appl. No.: 14/170,799

(22) Filed: Feb. 3, 2014

(65) Prior Publication Data

US 2015/0145904 A1 May 28, 2015

(30) Foreign Application Priority Data

Nov. 27, 2013 (TW) .............................. 102143169 A

(51) Int. Cl.
*G09G 3/32* (2006.01)
*H04N 13/04* (2006.01)

(52) U.S. Cl.
CPC ......... *G09G 3/3208* (2013.01); *H04N 13/0404* (2013.01); *H04N 13/0422* (2013.01); *H04N 13/0497* (2013.01); *G09G 2320/0626* (2013.01); *G09G 2320/10* (2013.01)

(58) Field of Classification Search
CPC ............ G09G 3/3208; G09G 2320/10; G09G 2320/0626; G09G 27/22; G09G 27/2214; G09G 27/2228; H04N 13/0404; H04N 13/0422; H04N 13/0497
USPC .................................................. 359/462, 463
See application file for complete search history.

(56) References Cited

U.S. PATENT DOCUMENTS

| 7,416,917 | B2 | 8/2008 | Ko | |
|---|---|---|---|---|
| 7,883,386 | B2 | 2/2011 | Ho et al. | |
| 2005/0280637 | A1* | 12/2005 | Ikeda et al. | 345/173 |
| 2006/0238673 | A1 | 10/2006 | Roh | |
| 2007/0096125 | A1* | 5/2007 | Vogel et al. | 257/89 |
| 2011/0228231 | A1* | 9/2011 | Schreiber et al. | 353/31 |
| 2012/0062991 | A1* | 3/2012 | Krijn | H04N 13/0404 359/463 |
| 2013/0050817 | A1* | 2/2013 | Sumi | 359/463 |
| 2013/0100120 | A1* | 4/2013 | Sumi | 345/419 |
| 2013/0215342 | A1* | 8/2013 | Jeng | 349/15 |

FOREIGN PATENT DOCUMENTS

| TW | I275052 B | 3/2007 |
|---|---|---|
| TW | I282699 B | 6/2007 |
| TW | I290806 B | 12/2007 |

OTHER PUBLICATIONS

TW Office Action dated Jun. 12, 2015 in corresponding application (No. 102143169).

* cited by examiner

*Primary Examiner* — Tom Sheng
(74) *Attorney, Agent, or Firm* — McClure, Qualey & Rodack, LLP

(57) ABSTRACT

A display panel is provided. The display panel includes: a white-light organic light-emitting diode (WOLED) array, having a plurality of pixels, wherein the pixels are divided into multiple light groups and the light groups emit light according to a driving signal; a lens layer, configured to receive light from the WOLED array; a color filter layer, having color filters in different colors to filter the light from the lens layer; and a driving circuit, configured to receive a light group control signal and generate a driving signal to control the emission of the light groups, wherein the lens layer is placed between the color filter layer and the WOLED array, and is configured to refract the light emitted from each light group of the WOLED array, so that the light passes through the color filter layer to form images.

11 Claims, 15 Drawing Sheets

| Display settings | | | | | | | | | | | | | | | | | | | | |
|---|---|---|---|---|---|---|---|---|---|---|---|---|---|---|---|---|---|---|---|---|
| | 1 | Image | 1 | | | | | | | | | Image | R | L | | | | | | |
| | 2 | | | | | | | | | | | | | | | | | | | |
| | | Image | 1 | 2 | 3 | 1 | | | | | | Image | R | L | R | L | | | | |
| | 3 | Image | 1 | 2 | 3 | 1 | | | | | | Image | R | L | R | L | | | |
| | 3 | Viewtag | off | off | off | off | | | | | | Viewtag | 1 | 2 | 3 | 4 | | | |
| Center first light group 4 | 3 | Viewtag | off | A | A | A | | | | | | Viewtag | off | off | off | Al | | | |
| Center first light group 2/3 | 3 | Viewtag | off | A | A | off | | | | | | Viewtag | 1 | 2 | 3 | 4 | | | |
| | 3 | Viewtag | off | A | A | A | | | | | | Viewtag | off | Al | Ar | off | | | |
| Max view | 3 | Viewtag | A | A | A | A | | | | | | Viewtag | 1 | 2 | 3 | 4 | | | |
| | | | | | | | | | | | | | Ar | Al | Ar | Al | | | |
| | | | | | | | | | | | | | 1 | 2 | 3 | 4 | | | |
| Low Error | | | | | | | | | | | | Viewtag | Al | Al | Al | Al | | | |

FIG. 5B-1

| FIG. 5B-1 | FIG. 5B-2 |
|---|---|

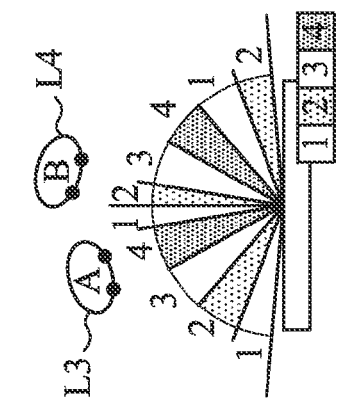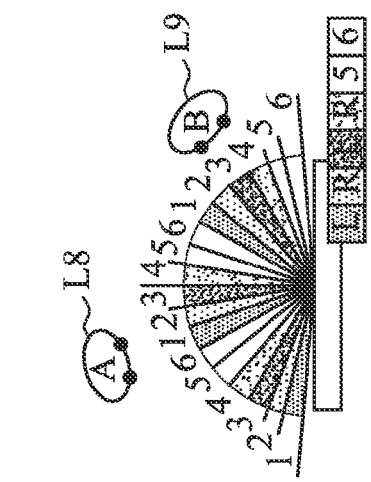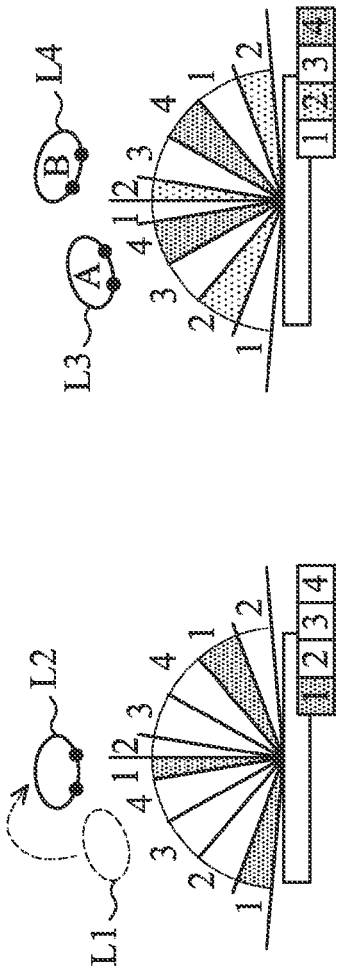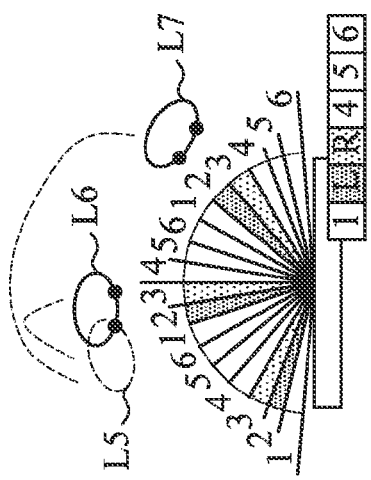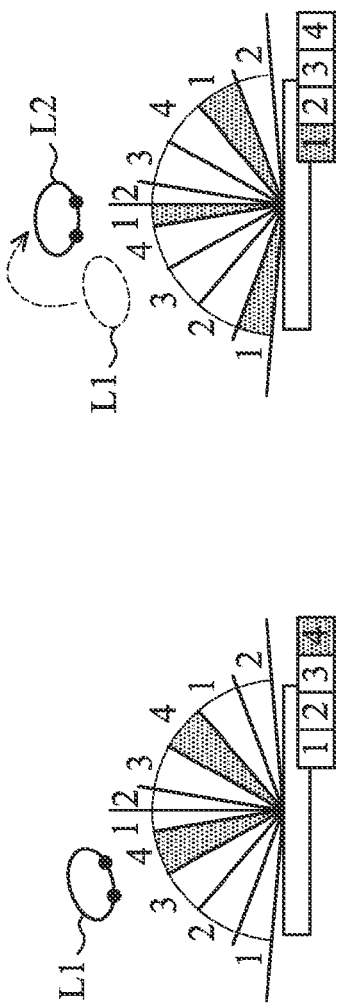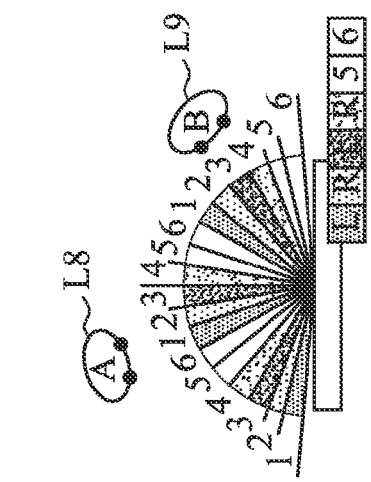
FIG. 6B  FIG. 6C  FIG. 6D
FIG. 6E  FIG. 6F  FIG. 6G

IMAGE DISPLAY METHOD AND DISPLAY SYSTEM

CROSS REFERENCE TO RELATED APPLICATIONS

This application claims priority of Taiwan Patent Application No. 102143169, filed on Nov. 27, 2013, the entirety of which is incorporated by reference herein.

BACKGROUND OF THE INVENTION

1. Field of the Invention

The present invention relates to image processing, and in particular to an image display method and a display system capable of automatically detecting the light group where the user is located, and controlling various light groups in a white-light organic light-emitting diode (WOLED) array to display corresponding images.

2. Description of the Related Art

With advances in display technologies, organic light-emitting diodes (OLED) have been applied to display panels. OLED is a technology for applying electric current to organic semiconductor materials and light-emitting materials to achieve the emission of light for use in displays. Compared with conventional liquid-crystal display (LCD) technologies, OLEDs may have a lot of advantages such as lighter weight, lower thickness, higher brightness, larger viewing angle (up to 170 degrees), no back-light required, lower power consumption, faster response time, better sharpness, lower heat, excellent anti-quake ability, etc. Although conventional OLED panels have the aforementioned advantages, they still cannot provide independent view control of two-dimensional images or stereoscopic images.

BRIEF SUMMARY OF THE INVENTION

A detailed description is given in the following embodiments with reference to the accompanying drawings.

In an exemplary embodiment, an image display method for use in a display system is provided. The display system includes a display panel, the display panel comprises a color filter layer, a lens layer, and a white-light organic light-emitting diode (WOLED) array, wherein the lens layer, placed between the color filter layer and the WOLED array, is configured to refract light emitted from light groups of the WOLED array, so that the lights pass through the color filter layer to form images. The image display method includes: receiving a video signal; analyzing an image format of the video signal; converting the video signal to a light group control signal of each light group of the WOLED array according to a display setting of the display system and the image format of the video signal; and determining whether each light group is activated for display according to the light group control signal.

In another exemplary embodiment, a display system is provided. The display system includes: a white-light organic light-emitting diode (WOLED) array, having a plurality of pixels, wherein the pixels are divided into multiple light groups and the light groups emit light according to a driving signal; a lens layer, configured to receive light from the WOLED array; a color filter layer, having color filters in different colors to filter the light from the lens layer, wherein the lens layer is placed between the color filter layer and the WOLED array, and is configured to refract the light emitted from each light group of the WOLED array, so that the light passes through the color filter layer to form images; a driving circuit, configured to receive a light group control signal and generate a driving signal to control the emission of the light groups; and a video processor, configured to receive a video signal, analyze an image format of the video signal, and convert the video signal to a light group control signal of each light group of the WOLED array according to a display setting of the display system and the image format of the video signal, wherein the WOLED array further determines whether each light group is activated for display according to the light group control signal.

BRIEF DESCRIPTION OF THE DRAWINGS

The present invention can be more fully understood by reading the subsequent detailed description and examples with references made to the accompanying drawings, wherein:

FIGS. 5B-1 and 5B-2 are portions of a diagram illustrating light groups and corresponding viewtags in different display modes in accordance with an embodiment of the invention;

FIG. 6B is a diagram illustrating the relationship between the location of a user and the viewable range of light groups for displaying two-dimensional images in accordance with an embodiment of the invention;

FIG. 6C is a diagram illustrating the relationship between the location of a user and the viewable range of light groups for displaying two-dimensional images in accordance with another embodiment of the invention;

FIG. 6D is a diagram illustrating the relationship between locations of multiple users and the viewable region of light groups for displaying stereoscopic images in accordance with an embodiment of the invention;

FIG. 6E is a diagram illustrating the relationship between locations of multiple users and the viewable region of light groups for displaying stereoscopic images in accordance with another embodiment of the invention;

FIG. 6F is a diagram illustrating the relationship between locations of multiple users and the viewable region of light groups for displaying stereoscopic images in accordance with yet another embodiment of the invention;

FIG. 6G is a diagram illustrating the relationship between locations of multiple users and the viewable region of light groups for displaying stereoscopic images in accordance with another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
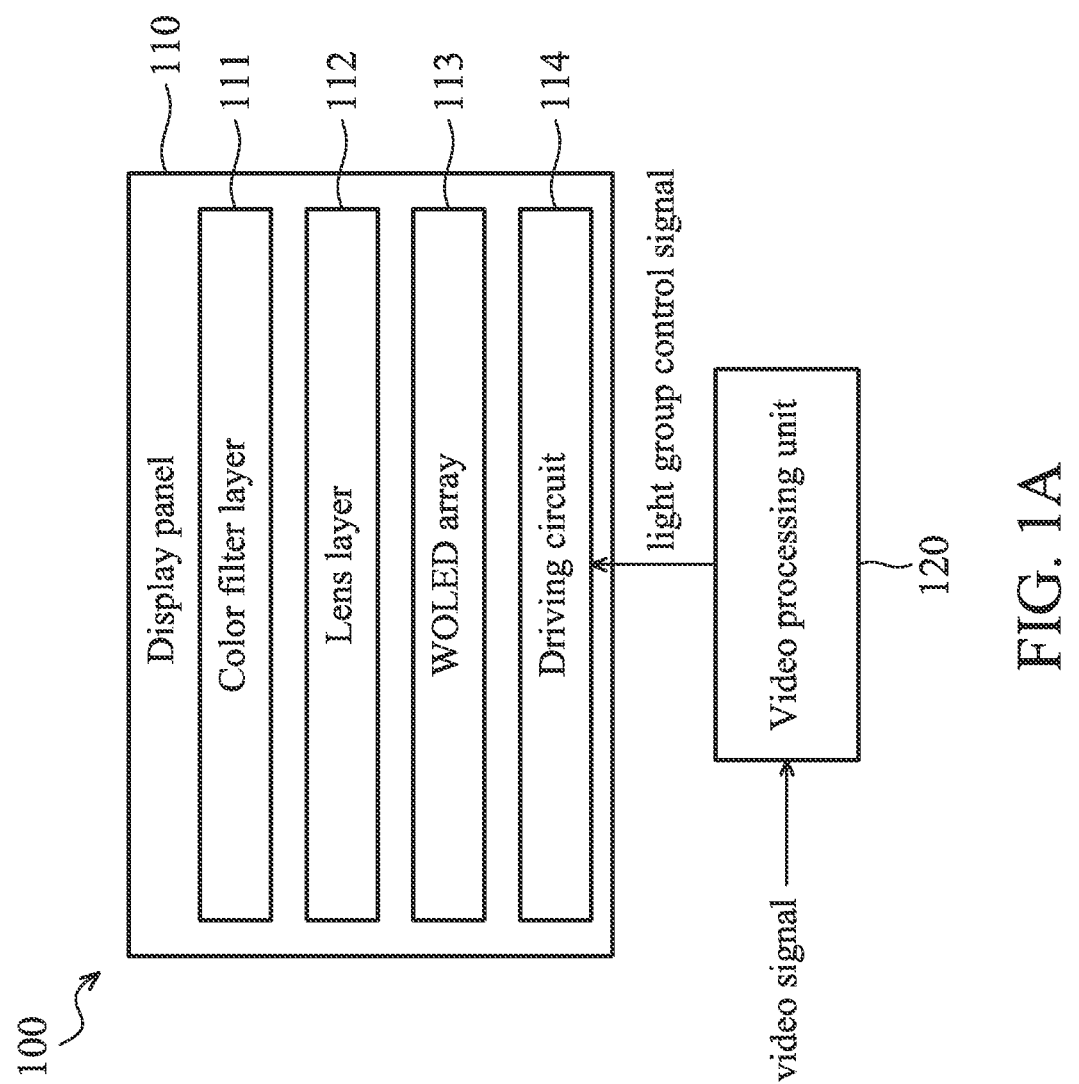
FIG. 1A is a schematic block diagram of a display system in accordance with an embodiment of the invention.
Figure 1B:
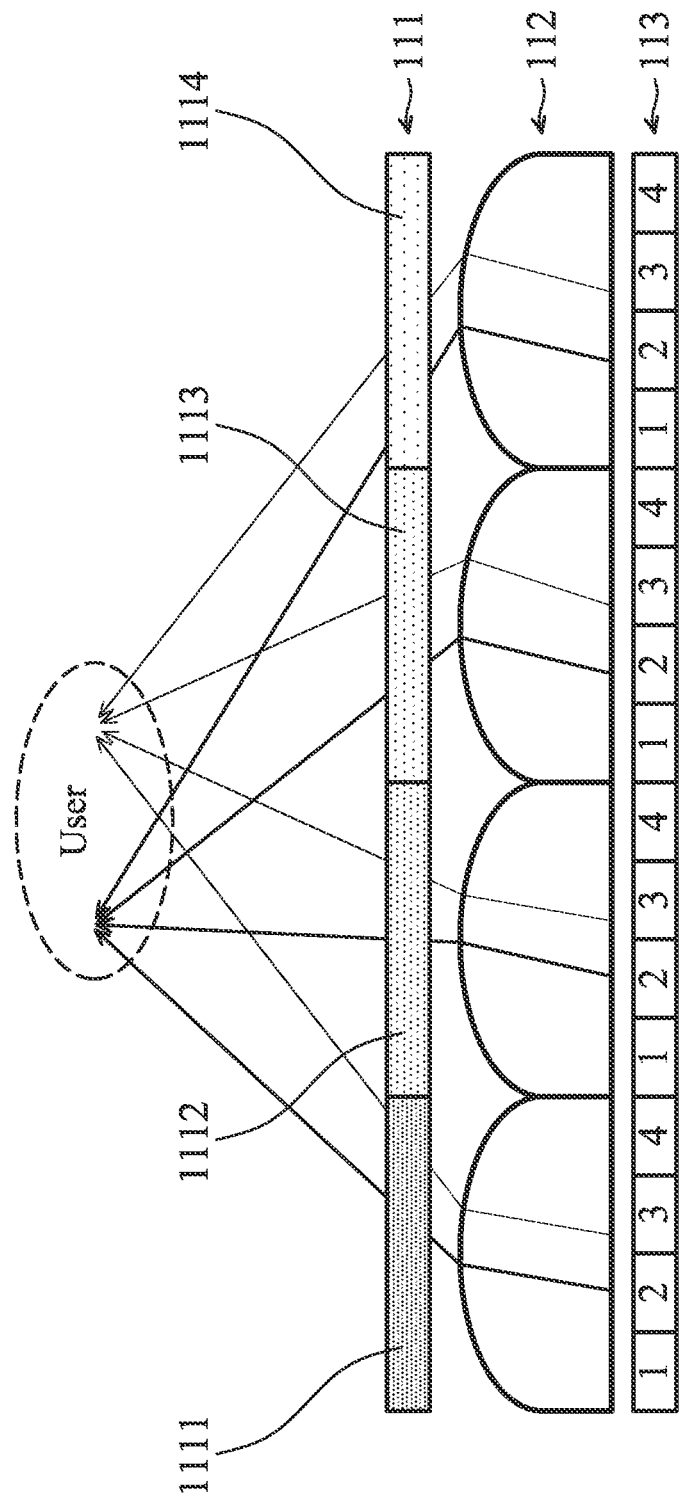
FIG. 1B is a diagram illustrating light passing through a display panel to form images on the eyes of a user in accordance with an embodiment of the invention.

FIG. 1A is a schematic block diagram of a display system in accordance with an embodiment of the invention. FIG. 1B is a diagram illustrating light passing through a display panel to form images on the eyes of a user in accordance with an embodiment of the invention. As illustrated in FIG. 1A, the display system 100 may comprise a display panel, and a video processing unit 120, where the display panel 110 is composed of a WOLED array. In an embodiment, the display panel 110 may comprise a color filter layer 111, a lens layer 112, a WOLED array 113, and a driving circuit 114. The color filter layer 111 is the top layer of the display panel, which is closest to the user, and is configured to form colors such as RGB or RGBW. In other words, the light passing through the lens layer 112 may enter the eyes of the user through the color filter layer 111. The lens layer 112 is configured to direct lights from different light groups of the WOLED array 113 to different directions (details will be described later), as illustrated in FIG. 1B. The WOLED array 113 may comprise multiple WOLED groups which are arranged regularly, and the arrangement of the light groups corresponds to the design of the lens layer, wherein the intensity of each WOLED can be adjusted. For example, a light group may be in the form of bars or diagonal bars, and the number of light groups is at least two, and the light groups are arranged symmetrically and periodically. It should be noted that, in the embodiments of the invention, for description, the number of light groups are 4, 6, or 8 for example. For those skilled in the art, it should be appreciated that the numbers of light groups are not limited thereto. The driving circuit 114 is configured to control the emission of each WOLED (e.g. R/G/B/W sub-pixels) in the WOLED array 113.

The video processing unit 120 is configured to receive a multiple-image video signal (e.g. a multi-view video signal) or receive a video signal having only one view, and convert the received video signal to a multiple-image signal. Afterwards, the video processing unit 120 may further convert the multiple-image signal to a corresponding light group control signal. The light group control signal may control the emission (e.g. emitting light) of the corresponding light group in the WOLED array 113.

Referring to FIG. 1B, each pixel in the color filter layer 11 may have a corresponding color (e.g. R/G/B/W), which is composed of color filters in different colors, such as a red color filter 1111, a green color filter 1112, a blue color filter 1113, and a white color filter 1114. For example, each set consisting of a red color filter 1111, green color filter 1112, blue color filter 1113, and white color filter 1114, which are arranged in order, can be regarded as a "pixel filter set". It should be noted that each color in the WOLED array 113 may have a corresponding light group, where the locations labeled 1, 2, 3, and 4 denote the number of the light group of the corresponding pixel. When the video processor 121 controls a certain light group to display images such as light group 1, it indicates that the sub-pixels of the light group 1 may emit lights in order, and the emitted light may form images on the eyes of the user by passing through the color filters in a corresponding color after being refracted by the lens layer 112.

Figure 2A:
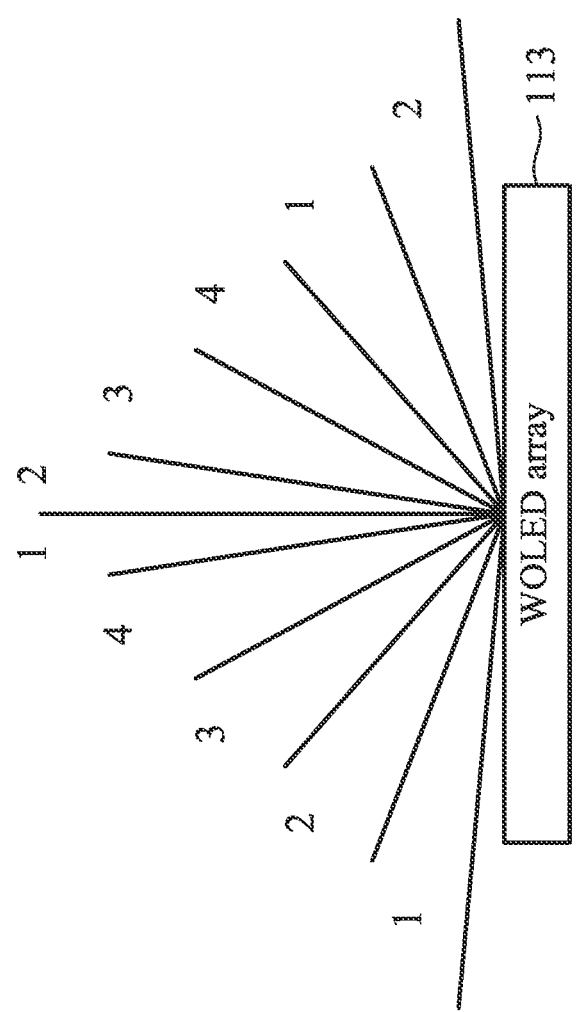
FIG. 2A is a diagram illustrating the lights being distributed into different view angles by the display system 100 in accordance with an embodiment of the invention.
Figure 2C:
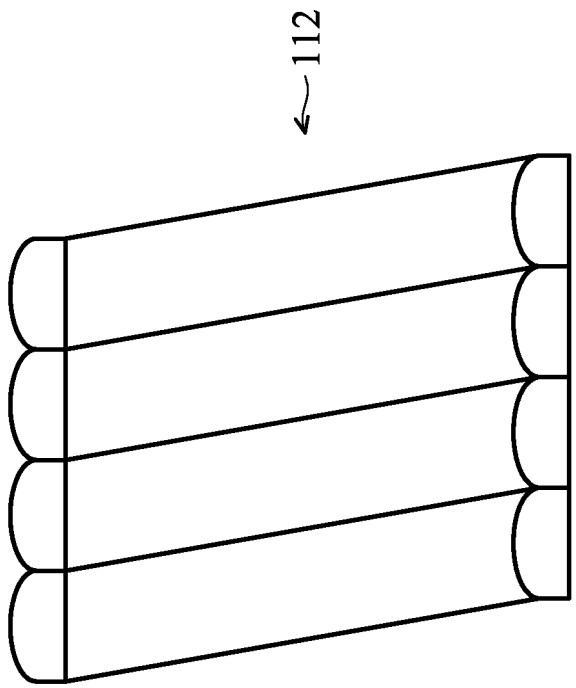
FIGS. 2B and 2C are diagrams illustrating arrangement of the lens layer and the WOLED array in accordance with some embodiments of the invention.
Figure 2C:
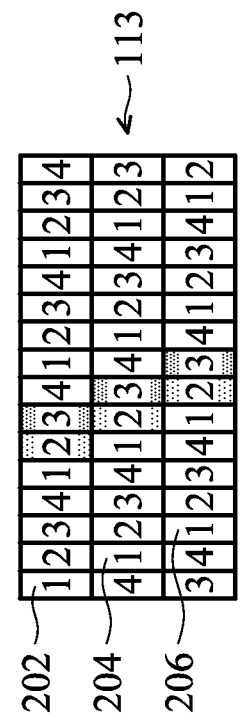
Figure 2B:
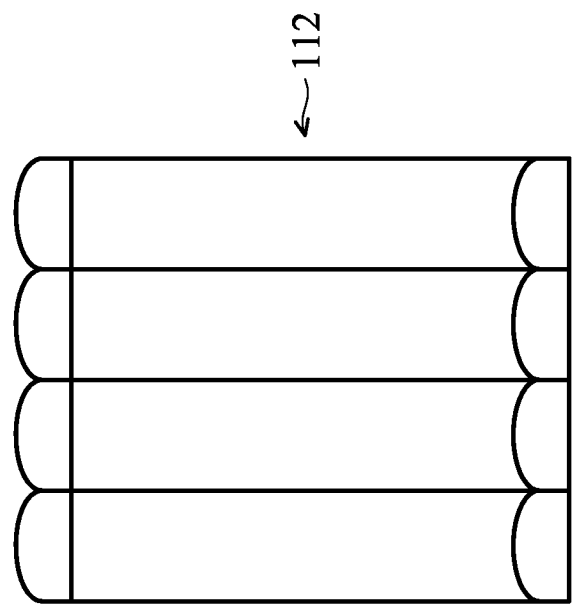
Figure 2B:
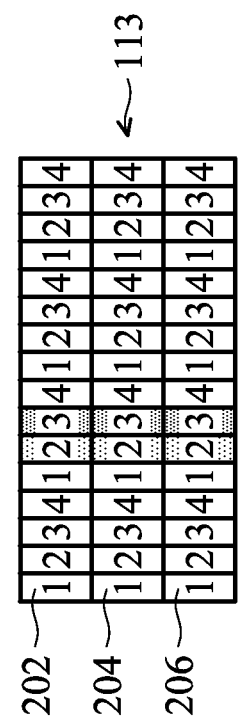

FIG. 2A is a diagram illustrating the lights being distributed into different view angles by the display system 100 in accordance with an embodiment of the invention. As illustrated in FIG. 2A, the WOLED array 113 may have four different light groups 1~4, and the video processing unit 120 may convert the received video signal into a corresponding multi-image signal, and generate four light group control signals correspondingly. FIGS. 2B and 2C are diagrams illustrating arrangement of the lens layer and the WOLED array in accordance with some embodiments of the invention. As illustrated in FIG. 2B, taking RGB images for example, the pixel of each WOLED in the WOLED array 113 is composed of red, green, and blue sub-pixels, such as sub pixels 202, 204, 206 in FIGS. 2B and 2C, respectively. When the lens layer 212 is in the form of perpendicular bars, it indicates that the lights enters the lens layer 212 in the direction perpendicular to the surface of the lens layer 212, and the sub-pixels 202~206 can be aligned, as illustrated in FIG. 2B. When the lens layer 212 is in the form of diagonal bars, it indicates that the light enters the lens layer 212 in the direction having a fixed angle, and the arrangement of the sub-pixels 202~206 should follow the fixed angle at the lens layer 212, as illustrated in FIG. 2C. Specifically, the aforementioned four light group control signals are configured to control the WOLEDs having the corresponding number in FIG. 2B or 2C to emit light.

Figure 3A:
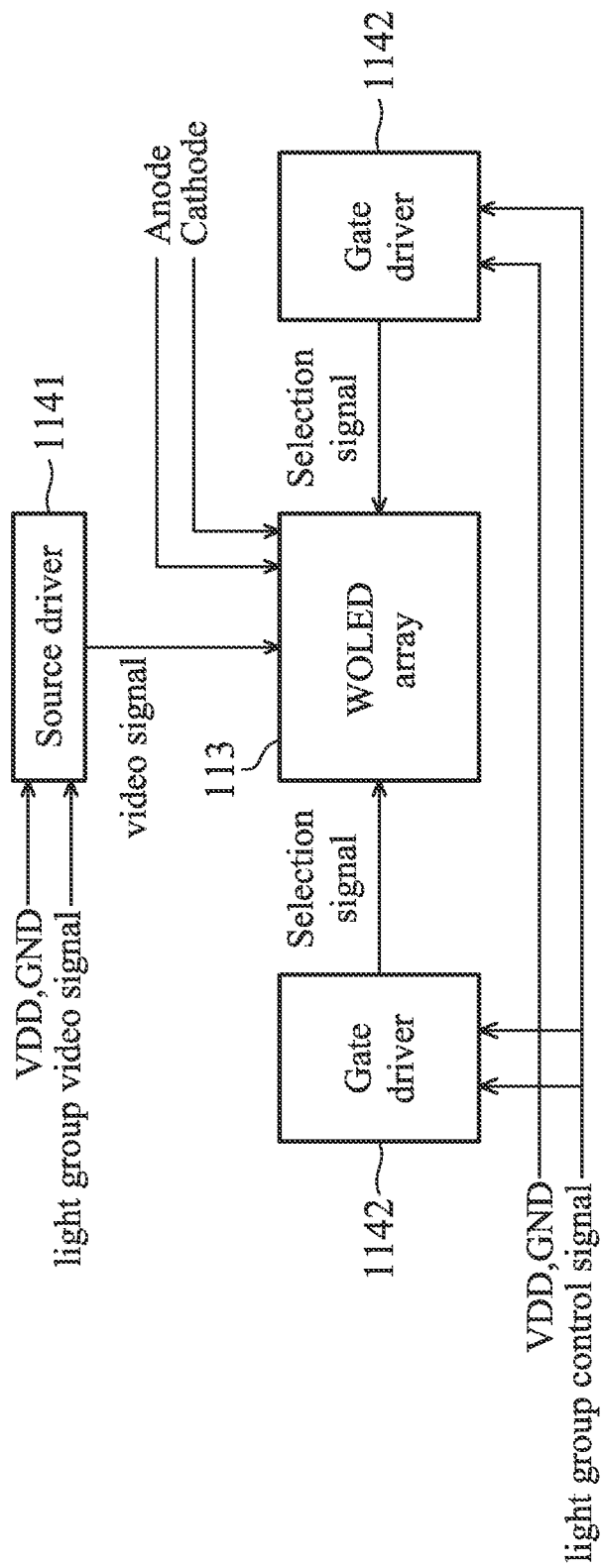
FIG. 3A is a diagram illustrating the connection between the WOLED array 113 and the driving circuit 114 in accordance with an embodiment of the invention.

FIG. 3A is a diagram illustrating the connection between the WOLED array 113 and the driving circuit 114 in accordance with an embodiment of the invention. In an embodiment, the driving circuit 114 may comprise a source driver 1141 and a gate driver 1142. The intensity of each sub-pixel in the WOLED array 113 can be controlled by the source driver 1141 and the gate driver 1142. For example, voltages VDD and GND are supplied to the source driver 1141 and the gate driver 1142 configured to receive the light group control signals and corresponding video signals generated by the video processing unit 120, which are further converted to selection signals of each WOLED in the WOLED array 113, thereby control the intensity of each WOLED.

Figure 3B:
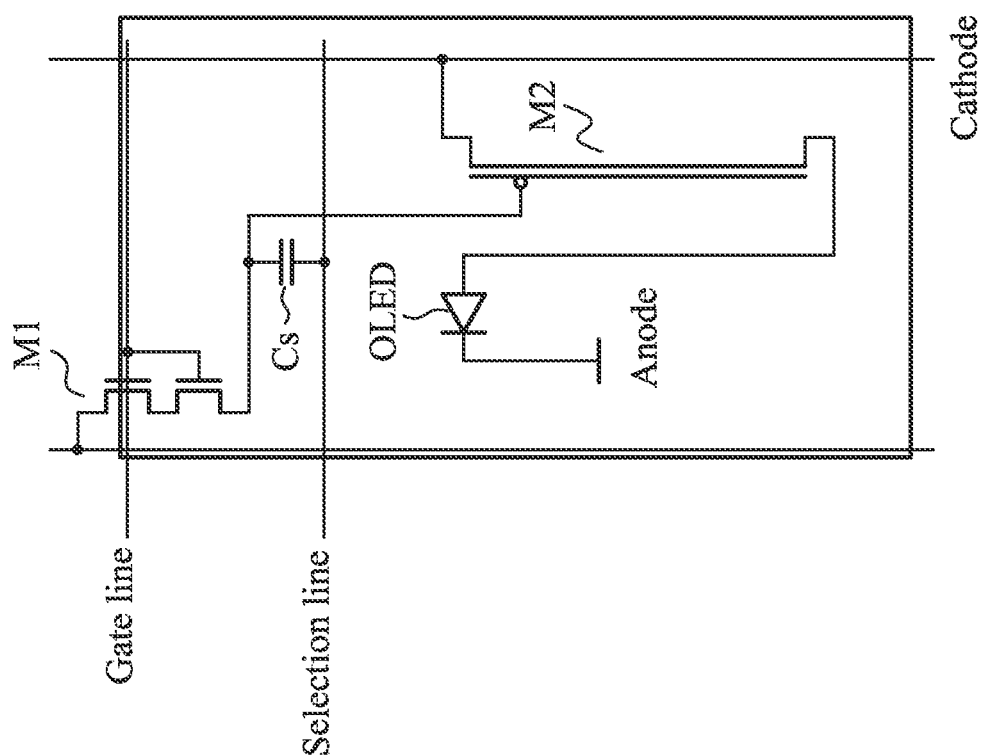
FIG. 3B is a circuit diagram of a sub-pixel in accordance with an embodiment of the invention.
Figure 3C:
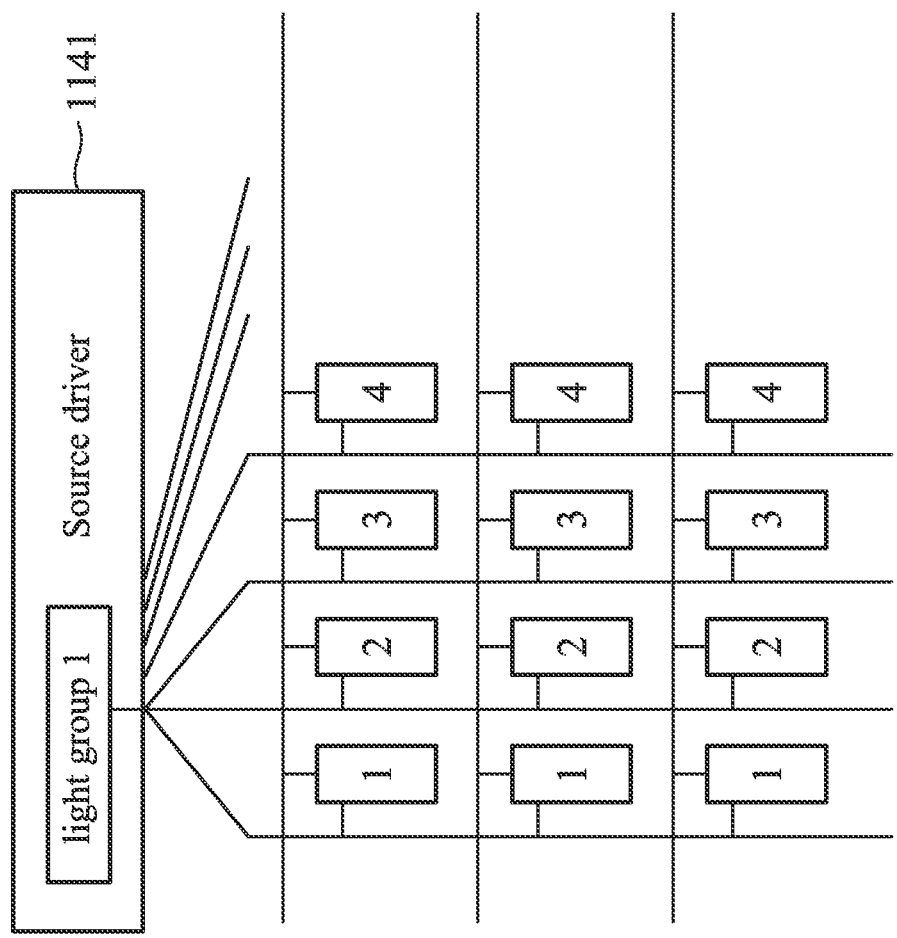
FIG. 3C is a diagram illustrating the source driver in accordance with an embodiment of the invention.

FIG. 3B is a circuit diagram of a sub-pixel in accordance with an embodiment of the invention. FIG. 3C is a diagram illustrating the source driver in accordance with an embodiment of the invention. As illustrated in FIG. 3C, each sub-pixel (e.g. R/G/B) may have a corresponding light group. When the source driver 1141 has received the light group signals, the source driver 1141 may convert the light signals into corresponding light group control signals of each WOLED. For example, given that only light groups 1 and 3 are processed by the video processing unit 120, when driving the first pixel in the first line of the WOLED array 113, the source driver 1141 may follow the raster scan order (e.g. activating the sub-pixels of light group 1 first, and then activating sub-pixels of light group 3) to control the intensity of each WOLED. It should be noted that the light group signals sent by the video processing unit 120 may designate a pixel to be black or a certain light group to be black entirely. Accordingly, the source driver 1141 and the gate driver 1142 may not provide the activation voltage to the designated light group. Specifically, when driving the first pixel in the first line of the WOLED array 113, the light group signals sent by the video processing unit 120 may control the emission of light groups 1, 2, 3, and 4 in order. If a certain light group is not activated, the corresponding sub-pixels in the light group will not be activated (i.e. all black), wherein the sub-pixel circuit 300 is illustrated in FIG. 3B. In FIG. 3B, the transistors M1, M2 and the OLED L1 of the sub-pixel circuit 300 are controlled by the video signal line from the source driver 1141 and the gate line and the selection line from the gate driver 1142. For those skilled in the art, it is appreciated that the operations of the sub-pixel circuit are well-known, and the details will not be described here.

Figure 4A:
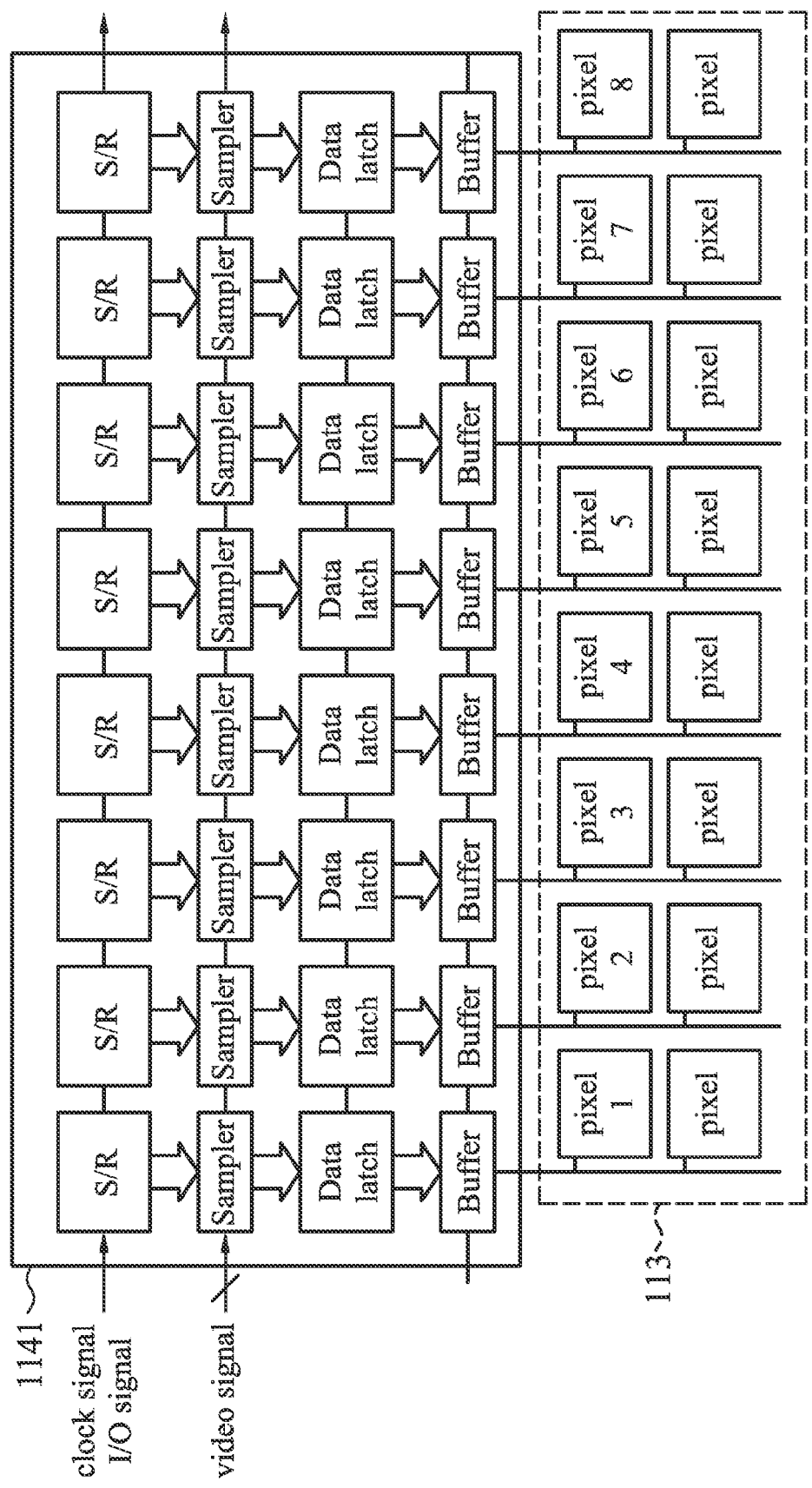
FIG. 4A is a schematic block diagram of the source driver in accordance with an embodiment of the invention.

FIG. 4A is a schematic block diagram of the source driver in accordance with an embodiment of the invention. In an embodiment, the source driver 1141 may be designed to control the sub-pixels in different light groups independently, and it indicates that each set of the shift register, the sampling unit, the data latch, and the buffer may correspond to multiple sub-pixels (e.g. R/G/B sub-pixels) in the same light group, wherein the storing/loading unit may receive the clock signal. It should be noted that the source driver 1141 may follow the raster scan order (e.g. from left to right and from up to down) to control light groups and sub-pixels of each pixel along a horizontal scan line.

Figure 4B:
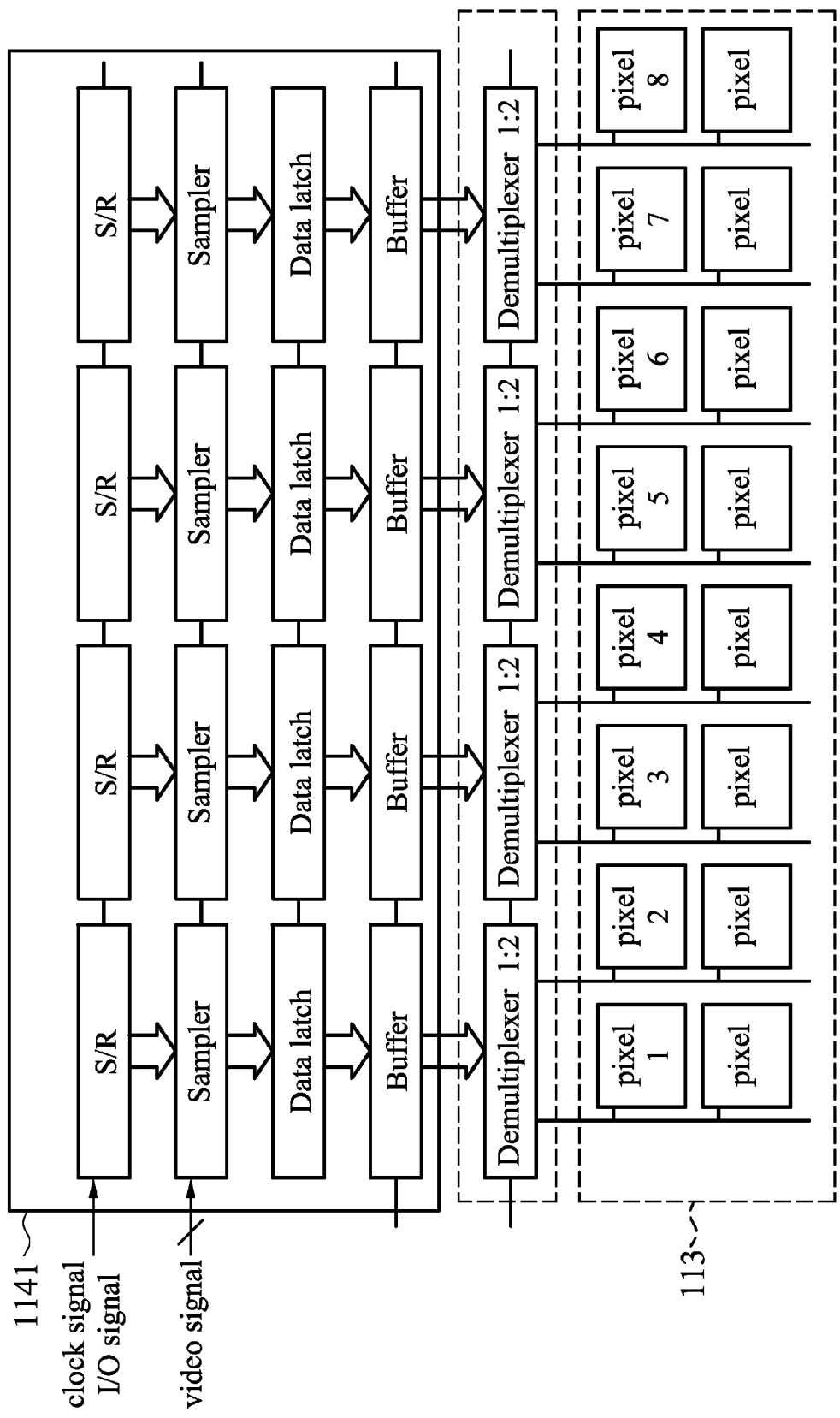
FIG. 4B is a schematic block diagram of the source driver in accordance with another embodiment of the invention.

FIG. 4B is a schematic block diagram of the source driver in accordance with another embodiment of the invention. In another embodiment, the difference between FIG. 4B and FIG. 4A is that the source driver 1141 outputs control signals to the WOLED array 113 through a 1-to-2 de-multiplexer, thereby controlling pixels in pairs. It should be noted that the aforementioned de-multiplexers are placed between the source driver 1141 and the WOLED array 113. Specifically, the light group control signals for controlling the WOLED array 113 can be implemented inside or outside of the source driver 1141.

It should be noted that each light group in the WOLED 113 not only supports common two-dimensional images, but also stereoscopic images/three-dimensional images. By utilizing the light group design of the invention, the lights from the WOLED array can be used effectively, and the lights are directional. It is not necessary for the light group at the unused view angles to emit light, thereby saving power. In addition, the directional light source can be used to prevent peeking, or to provide identical/different stereoscopic images to one or more users at different locations.

Figure 5A:
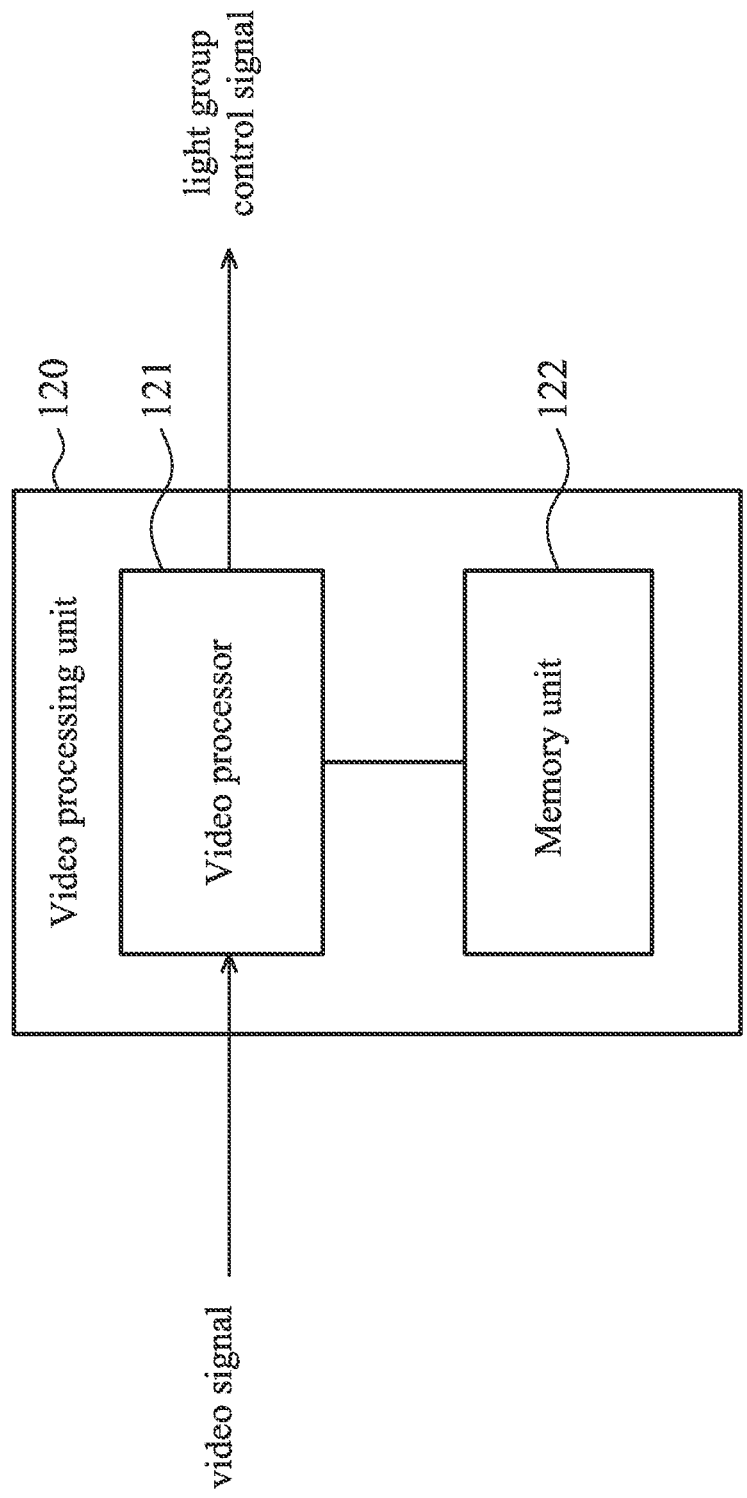
FIG. 5A is a schematic block diagram of the video processing unit 120 in accordance with an embodiment of the invention.

FIG. 5A is a schematic block diagram of the video processing unit 120 in accordance with an embodiment of the invention. In an embodiment, the video processing unit 120 may comprise a video processor 121 and a memory unit 122, as illustrated in FIG. 5A. The video processor 121 may be, for example, a central processing unit (CPU) or a digital signal processor (DSP), and the memory unit 122 may be a random access memory (e.g. SRAM or DRAM). The video processor 121 is configured to receive a video signal, and store the video signal into the memory unit 122, wherein the video signal may be two-dimensional images having a single view, stereoscopic images (e.g. left-eye images and corresponding right-eye images), or video signals composed of multi-view images (e.g. two-dimensional images or stereoscopic images). When the received video signal is to be displayed on the display system 100, the video processor 121 may analyze the image format of the video signal, and adjust the output light group signal according to the display settings (e.g. viewing angles, stereoscopic images/multi-view images or not) of the display system 100. Specifically, the video processor 121 may label a viewtag on the corresponding light group according to the display settings of the display system 100. Accordingly, when the video processor 121 reads the images of the video signal from the memory unit 122, the video processor 121 may determine the light groups to display the images according to the viewtag of the light groups.

Figures 2, 5B:
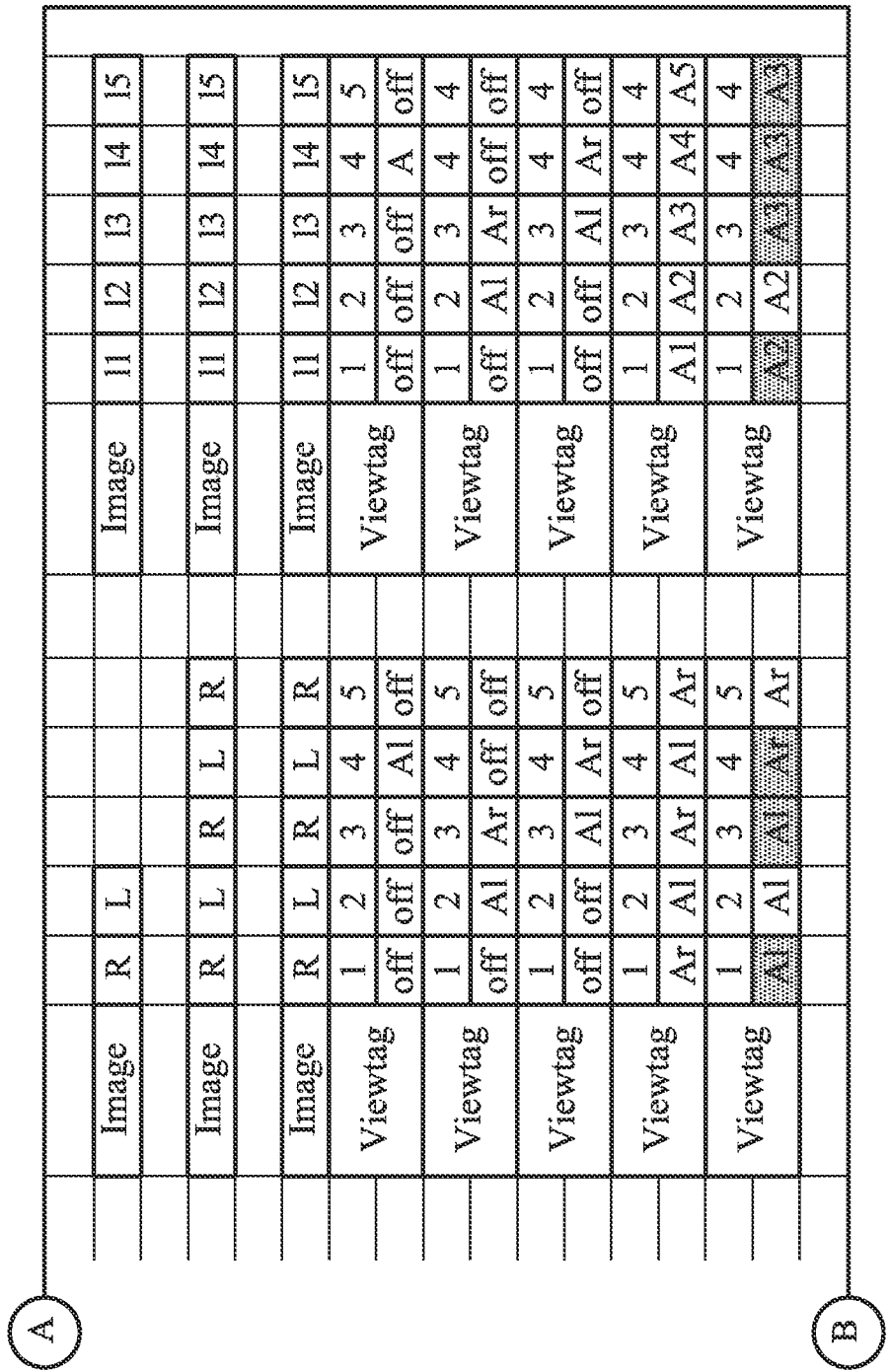

FIG. 5B is a diagram illustrating light groups and corresponding viewtags in different display modes in accordance with an embodiment of the invention. For example, in an embodiment, if the video signal received by the display system 100 is composed of common two-dimensional images I, the video processor 121 may give a viewtag to the corresponding light group according to the emphasized view angles in different display modes, thereby activating corresponding light groups and transmitting associated images of the video signal to the corresponding light groups for display. For example, in the center first-light group 4 mode, only WOLEDs in the light group 4 will be activated, indicating the label A in FIG. 5B. In the max view mode, light groups 1-4 are labeled with corresponding viewtags, such as "Al" indicating activation of left-eye images, "Ar" indicating activation of right-eye images, "Off" indicating deactivation of the light group. In other words, in the max view mode, light groups are all activated.

In another embodiment, the video signal received by the display system 100 includes stereoscopic images, which comprise left-eye images and right-eye images. However, each light group of the WOLED array 113 is capable of displaying signal two-dimensional images. Accordingly, if the WOLED array 113 is used to display stereoscopic images, two neighboring light groups should be used. For example, as illustrated in FIG. 5B, in the center-first light group 2/3 mode, the light group 2 and light group 3 are labeled with an individual viewtag, wherein the light group 2 is for displaying left-eye images, and the light group 3 is for displaying right-eye images. Meanwhile, light groups 1 and 4 are deactivated. Referring to FIG. 2A again, it should be noted that the stereoscopic images can only be viewed correctly when the user is located at the intersection of the ranges of light groups 2 and 3 (e.g. positions 210 and 220). It indicates that left-eye images should be projected into the left eye of the user, and right-eye images should be projected into the right eye of the user. In the max view mode, light groups 1~4 are all activated, wherein light groups 1 and 3 are for displaying left-eye images, and light groups 2 and 4 are for displaying right-eye images. It should be noted that, when stereoscopic images are displayed by the display system 100, since the light emitted from each light group may have a limited range/angle and the left-eye/right-eye images should be correctly projected into the left eye/right eye of the user, a specific angle should be selected by the user to view the stereoscopic images correctly. In addition, referring to FIG. 5B, each display mode can be switched freely when viewing the same video signal, and the video processor 121 may control activation/deactivation of each light group independently and the images to be displayed on each activated light group.

Specifically, when the received video signal is to be displayed on the display system 100, the video processor 121 may analyze the format of the received video signal, and adjust the output light group signal according to the display settings of the display system 100. In an embodiment, if the video signal is composed of two-dimensional images in a single view, the video processor 121 may determine whether to duplicate the video signal to the light groups for display according to the display settings of the display system 100. For example, if the display settings of the display system 100 are to activate light groups 2 and 4, when the video processor 121 determines that the received video signal is composed of two-dimensional images in a single view, the video processor 121 may transmit the video signal to the light group 2 and the light group 4 simultaneously. If the display settings are set to the max view mode, the video processor 121 may transmit the video signal to the light groups 1~4 simultaneously.

In another embodiment, when the video processor 121 determines the received video signal is composed of multi-view images (i.e. independent images in different views), the video processor 121 may transmit the images in different views to the designated light groups according to the display settings of the display system 100. For example, if the video signal includes first view images, second view images, and third view images, the video processor 121 may transmit the first view images, the second view images, and the third view images to the light group 2, 3, and 4, respectively. The video processor 121 may also transmit the first view images and the second view images to the light groups 3 and 2, respectively. In other words, the video processor may transmit the images in different views of the video signal to the designated light groups, and control the display of each view of the multi-view video signal.

Figure 6A:
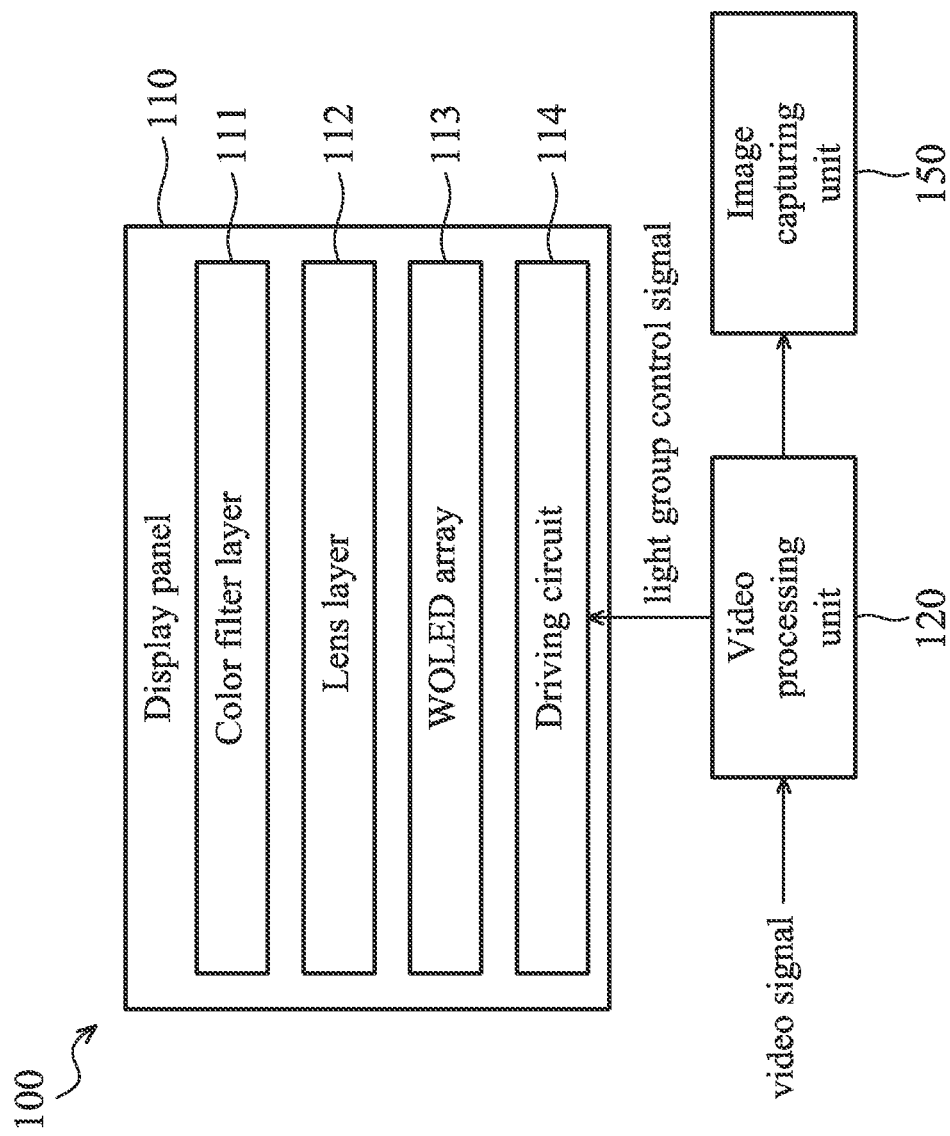
FIG. 6A is a schematic block diagram of the display system 100 in accordance with another embodiment of the invention.

FIG. 6A is a schematic block diagram of the display system 100 in accordance with another embodiment of the invention. FIG. 6B is a diagram illustrating the relationship between the location of a user and the viewable range of light groups for displaying two-dimensional images in accordance with an embodiment of the invention. In another embodiment, as illustrated in FIG. 6A, the display system 100 may comprise an image capturing unit 150 configured to capture facial images of the user, and the video processor 121 may further analyze the captured facial images from the image capturing unit 150, thereby detecting the eye positions of the user and determining the viewable region of the light groups the user is located at according to the detected eye positions. Accordingly, the video processor 121 may transmit the corresponding light group control signal (e.g. only the light group control signal of the light group 4 is activated) to the WOLED array 113 according to the user's position (e.g. position L1 in FIG. 6B), thereby activating the corresponding light groups in the WOLED array 113. Further, when the user moves, the video processor 121 may detect the position of the user after the movement from the captured facial images, and determine the light groups associated with the user's position (e.g. light group 4), thereby generating corresponding light group control signals (e.g. only the light group control signal of the light group 4 is activated) to control the display of the corresponding light groups of the WOLED array 113.

FIG. 6C is a diagram illustrating the relationship between the location of a user and the viewable range of light groups for displaying two-dimensional images in accordance with another embodiment of the invention. In an embodiment, the display system 100 may utilize the image capturing unit 150 to capture facial images of the user, and the video processor 121 may further analyze the captured facial images to detect whether the eye positions of the user move, and determine the viewable regions of the light groups associated with the eye positions of the user after the movement. When the viewable regions of the light groups associated with the eye position of the user after the movement are detected (e.g. moving from position L1 to L2, as shown in FIG. 6C), the video processor may generate corresponding light group control signals (e.g. light group 1), and it indicates that only light group 1 of the WOLED array 113 is activated for displaying images.

FIG. 6D is a diagram illustrating the relationship between locations of multiple users and the viewable region of light groups for displaying stereoscopic images in accordance with an embodiment of the invention. As illustrated in FIG. 6D, the display system 100 detects that the position of the user A is located at the viewable region of the light group 4, and the position of the user B is located at the viewable region of the light group 2. Then, the video processor 121 may generate a corresponding light group control signal to the WOLED array 113, thereby activating light groups 4 and 2. It should be noted that the images displayed by the light group 4 and light group 2 may be different, and the image display of light groups is based on the display settings of the display system 100 and user settings. If the input video signal only includes single-view images, the same images can be displayed by the light groups 4 and 2. If the input video signal includes multi-view images, the same or different view images can be displayed on the light group 4 and light group 2. It should be noted that the activation of other light groups other than light groups 4 and 2 should be based on the display settings of the display system 100 or the user settings.

FIG. 6E is a diagram illustrating the relationship between locations of multiple users and the viewable region of light groups for displaying stereoscopic images in accordance with another embodiment of the invention. In another embodiment, if the user wants to view stereoscopic images on the display system 100, stereoscopic images can only be viewed without problems when the left-eye and right-eye of the user respectively receive the left-eye images and right-eye images correctly. The display system 100 may also utilize the facial images captured by the image capturing unit 150 to detect the viewable region of the light groups associated with the eye positions of the user, thereby generating corresponding light group control signals to different light groups to display left-eye images or right-eye images. For example, as illustrated in FIG. 6E, the display system 100 detects that the left eye and right eye of the user A are located at the viewable regions of the light group 2 and light group 1, respectively, and the input video signal includes stereoscopic images. Accordingly, the video processor 121 may generate corresponding light group control signals to the WOLED array 113, thereby controlling the light group 2 to display left-eye images (labeled with L at light group 2) and controlling the light group 1 to display right-eye images (labeled with R at light group 1). It should be noted that the activation of light groups other than light groups 2 and 1 should be based on the display settings of the display system 100 or user settings.

FIG. 6F is a diagram illustrating the relationship between locations of multiple users and the viewable region of light groups for displaying stereoscopic images in accordance with yet another embodiment of the invention. In yet another embodiment, the display system 100 may also detect the user's position after movement, and determine the viewable regions of the light groups associated with the user's position after the movement. As illustrated in FIG. 6F, the user is at the location L5 in the beginning. If the user moves to the position L6, the display system 100 may detect the user's position L6 and that the left eye and right eye of the user are respectively located at the viewable regions of the light groups 3 and 2. Accordingly, the video processor 121 may generate corresponding light group control signals to the WOLED array 113, thereby controlling the light group 3 to display left-eye images and controlling the light group 2 to display right-eye images. If the user moves to the position L7, the display system 100 may also detect the user's location L7 and that the left eye and right eye of the user is respectively located at the viewable region of the light group 3 and 2. Accordingly, the video processor 121 may generate corresponding light group control signals to the WOLED array 113, thereby controlling the light group 3 to display left-eye images and controlling the light group 2 to display right-eye images. It should be noted that when the user moves to the location L6 or L7, the activation of light groups other than the light groups 3 and 2 should be based on the display settings of the display system 100 or the user settings.

FIG. 6G is a diagram illustrating the relationship between locations of multiple users and the viewable region of light groups for displaying stereoscopic images in accordance with another embodiment of the invention. In another embodiment, the display system 100 may further detect eye positions of multiple users, and determine the viewable regions of the light groups associated with left eyes and right eyes of the users. For example, as illustrated in FIG. 6G, the display system 100 detects that the left eye and right eye of the user A are respectively located at the viewable regions of the light groups 2 and 1, and the left eye and right eye of the user B are respectively located at the viewable regions of the light groups 4 and 3. The video processor 121 may generate corresponding light group control signals to the WOLED array 113, thereby controlling light groups 2 and 4 to display left-eye images, and controlling light groups 1 and 3 to display right-eye images. It should be noted that if the input video signal includes multi-view stereoscopic images, the stereoscopic images viewed by the users A and B may be in the same view or different views, and the displaying of view images should be based on the display settings of the display system 100 and the user settings. In addition, if there is conflict between the light groups of the eye positions of different users while displaying stereoscopic images, the user positions should be adjusted, so that the display system 100 may detect the user position after movement and adjust the light group control signal correspondingly, and the stereoscopic images can be viewed correctly by the users.

Figure 7:
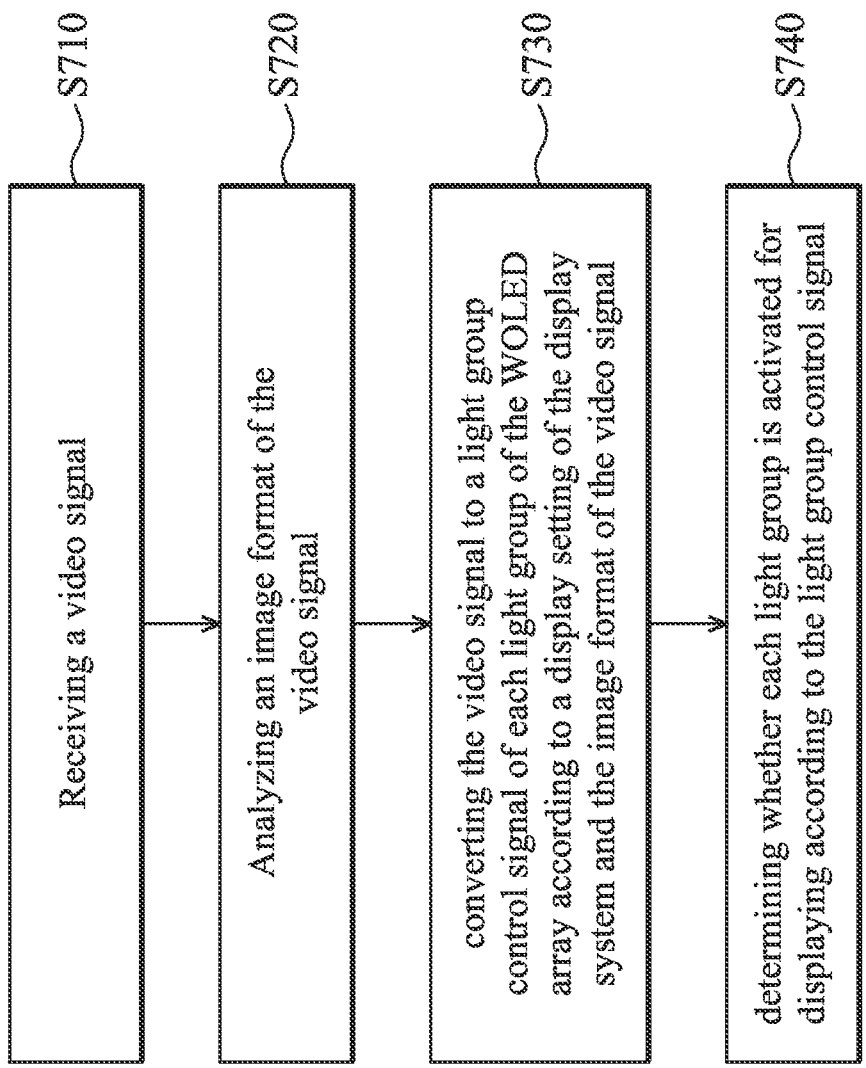
FIG. 7 is a flow chart illustrating an image display method in accordance with an embodiment of the invention.

FIG. 7 is a flow chart illustrating an image display method in accordance with an embodiment of the invention. In step S710, the display system receives a video signal. In step S720, the video processor 121 may analyze an image format of the video signal. It should be noted that the video signal may be two-dimensional images or stereoscopic images in a single view, or two-dimensional images or stereoscopic images in multiple views. In step S730, the video processor 121 may convert the video to a light group control signal corresponding to each light group according to a display setting of the display system 100 and the image format of the video signal. For example, the display setting can be set to a consistency mode or a difference mode. In the consistency mode, all light groups may display the same images. In the difference mode, different light groups may display different images. In step S740, the WOLED array 113 may determine the activation of each light group for display according to the light group control signal.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel, comprising:
   a white-light organic light-emitting diode (WOLED) array, having a plurality of pixels, wherein the WOLED array further comprises a plurality of LEDs and the LEDS are divided into multiple light groups, and each pixel comprises the LEDS in different light groups, and the light groups emit light according to a driving signal;
   a lens layer, configured to receive light from the WOLED array;
   a color filter layer, having color filters in different colors to filter the light emitted from the WOLED array; and
   a driving circuit, configured to receive a light group control signal and generate a driving signal to control the emission of the light groups,
   wherein each light group comprises a plurality of viewing regions, and each of the plurality of viewing regions indicate a spatial range of light emitted by each light group after refraction by the lens layer.

2. The display panel as claimed in claim 1, wherein the lens layer is placed between the color filter layer and the WOLED array.

3. The display panel as claimed in claim 1, wherein the driving circuit comprises a source driver and a gate driver, which are coupled to pixels of each light group of the WOLED array, and configured to control the emission of the pixels of each light group of the WOLED array according to the light group control signal.

4. The display panel as claimed in claim 1, wherein when a specific light group is selected to display images, the source driver and the gate driver close the other light groups other than the specific light group in the light groups.

5. The display panel as claimed in claim 1, wherein the driving circuit is directly coupled to the pixels of each light group of the WOLED array.

6. The display panel as claimed in claim 1, wherein the driving circuit is coupled to the pixels of each light group of the WOLED array via a de-multiplexer, and controls the WOLED array in two light groups as a unit.

7. The display panel as claimed in claim 1, wherein the lens layer comprises a plurality of lenses arranged perpendicularly in order.

8. The display panel as claimed in claim 1, wherein the lens layer comprises a plurality of lenses arranged diagonally in order.

9. The display panel as claimed in claim 1, wherein the color filter layer comprises a plurality of pixel filter sets, each having a red color filter, a green color filter, a blue color filter, and a white color filter.

10. A display system, comprising:
    a display panel as claimed in claim 1; and
    a video processing unit, configured to receive a video signal, and generate a light group control signal from the video signal according to a display setting of the display system, wherein the light group control signal controls displaying of each light group of the display panel.

11. An image display method for use in a display system, wherein the display system comprises a display panel as claimed in claim 1, the image display method comprising:
  driving the display panel;
  receiving a video signal; and
  generating a light group control signal from the video signal according to a display setting of the display system, wherein the light group control signal controls displaying of each light group of the display panel.

* * * * *